June 30, 1925

M. K. GILÉWICZ

FENDER

Filed March 25, 1925

1,544,444

WITNESSES

INVENTOR
MICHAEL K. GILÉWICZ
BY
ATTORNEYS

Patented June 30, 1925.

1,544,444

UNITED STATES PATENT OFFICE.

MICHAEL K. GILÉWICZ, OF NEW YORK, N. Y.

FENDER.

Application filed March 25, 1925. Serial No. 18,217.

*To all whom it may concern:*

Be it known that I, MICHAEL K. GILÉWICZ, a citizen of Argentina, and a resident of the city of New York, borough of the Bronx, in the county of Bronx and State of New York, have invented a new and Improved Fender, of which the following is a full, clear, and exact description.

This invention relates to fenders for automobiles and similar vehicles and has for an object to provide a fender wherein a safety guard is provided capable of easy manipulation.

Another object of the invention is to provide a fender with substantially the usual shaped fending bar and a plurality of collapsible means wherein a safety guard or auxiliary fending structure is provided, the same being capable of being normally nested and capable of quick distention or unfolding when needed.

A still further object of the invention is to provide a fender in which a quickly acting guard structure is provided for preventing a person or object from passing beneath the fender when struck.

In the accompanying drawing—

Figure 1:
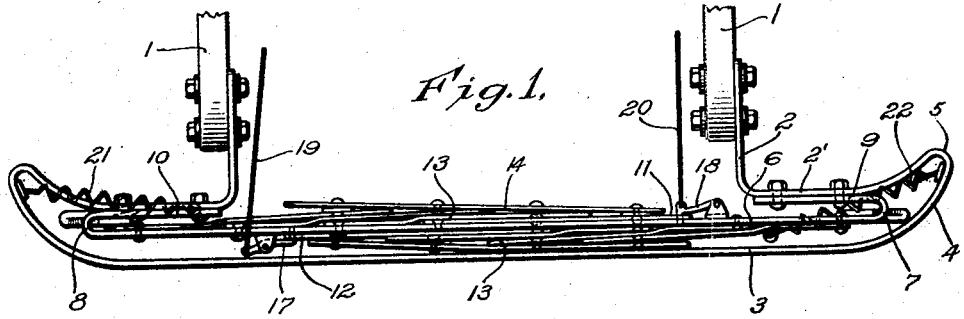
Figure 1 is a top view of a fender disclosing an embodiment of the invention, the same being shown as connected to the front part of an automobile.

Referring to the accompanying drawing by numerals, 1 indicates the front part of an automobile to which the rear extension 2 of the fender bar 3 is secured. The fender bar 3 is curved at the ends 4 and bent at 5 so that the extension 2 may be spaced inwardly from the end whereby the entire fender is slightly wider than the automobile. Connected to the respective sections 2' is a supporting bar 6 which is bent at 7 and 8 for providing short supporting sections 9 and 10 bolted or otherwise rigidly secured to the respective sections 2'. Mounted on the bar 6 are folding guard members 11 and 12. Each of these members is formed from a plurality of short bars 13 pivotally connected to the bar 6 and connected together at their outer ends by a connecting bar 14 secured in place by suitable rivets 15. The rivets 15 are such as to permit a free turning movement so that the respective guards 11 and 12 may be folded and unfolded whenever desired. One of the bars 13 of each of the members 11 and 12 is provided with an aperture 16 so as to receive the respective catches 17 and 18. The catch 17 is pivotally mounted on bar 6 on the front face thereof and acts to pass through the aperture 16 of the guard structure 12 while the catch 18 is pivotally mounted on the inner face of bar 6 and passes through the aperture 16 of the guard structure 11. Cords 19 and 20 are connected to the catches 17 and 18 respectively, said cords extending to a suitable point on the automobile 1 and may, if desired, be connected together so that the both catches will be operated simultaneously, though if preferred, they could be operated independently. Springs 21 and 22 are secured to suitable brackets 23 and 24 connected with the respective ends of the fender bar 3 and also connected with one of the bars 13 of the respective guard members 11 and 12. Springs 21 and 22 continually tend to move the parts to the position shown in Figure 3 so that whenever the catches 17 and 18 are released, these springs will quickly cause the guard members 11 and 12 to move from the position shown in Figures 1 and 2 to the position shown in Figure 3.

Figure 4:
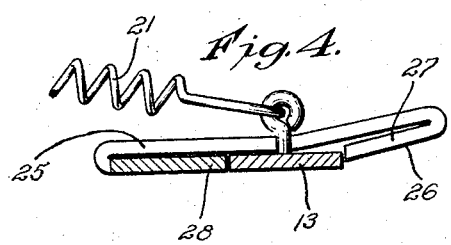
Figure 4 is an enlarged fragmentary sectional view through Figure 3 on line 4—4.

In order to limit the outward swinging movement of the members 11 and 12 and also to lock the same in their lowered or unfolded position, a stop and catch 25 is provided near each end of the fender bar 3. As indicated in Figure 4, when one of the bars 13 strikes the inclined surface 26 it will depress the same somewhat as this member is more or less resilient. As it depresses the member 27 and moves over face 26 it will snap behind member 27 as it comes to rest against the edge 28 of member 25. When the parts are in this position, it will be observed that by reason of the end of member 27 the bars 13 cannot move from this position until someone depresses member 27. When this has been done, the respective guard members 11 and 12 may be again folded and held in their folded position by their respective catches 17 and 18.

Figure 2:
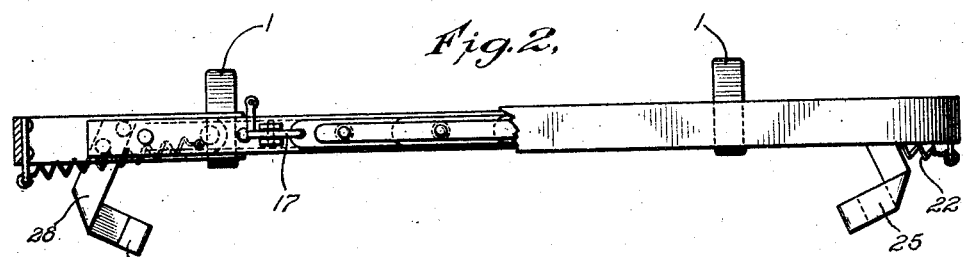
Figure 2 is a front view of the structure shown in Figure 1 with part of the front bar of the fender broken away for better illustrating the folding guard.

In operation, the parts are normally in the position shown in Figures 1 and 2.

Figure 3:
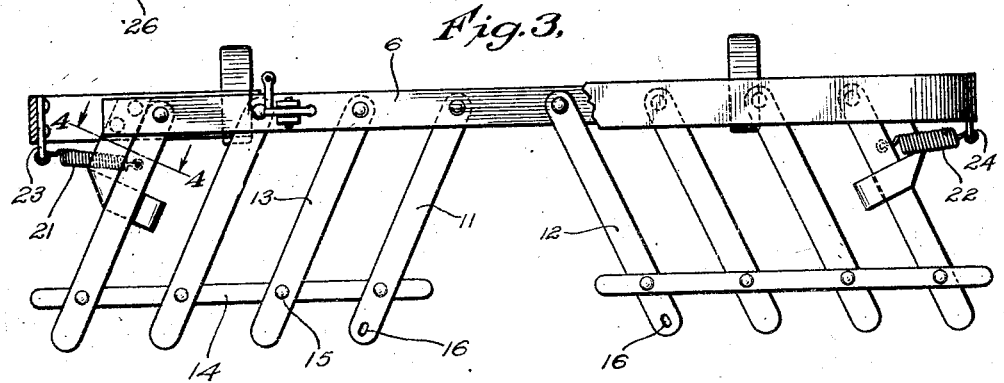
Figure 3 is a view similar to Figure 2 but showing the guard in its unfolded or distended position.

When the driver of the automobile believes that a person or object is about to be struck, he may pull one or both of the cords or cables 19 and 20 and as soon as this has been done, the catches will be moved out of engagement with the members 11 and 12 and springs 21 and 22 will immediately function to unfold and move the various parts to the position shown in Figure 3. After the automobile has been stopped, the driver must manually depress member 27 and manually fold the respective guard members 11 and 12 until the parts again assume the position shown in Figures 1 and 2. It will be noted that the guard members may be quickly moved to a guarding position under the action of springs but must be moved back manually in order to be in position for instant use at another time.

What I claim is:

1. A fender for vehicles, comprising a fender bar, a supporting bar connected to said fender bar and spaced therefrom, a pair of groups of folding guarding fingers hingedly connected with said supporting bar, a catch for each of said groups of fingers for normally holding the fingers in a folded position, manually actuated means for releasing said catches, and a spring for each of said groups for quickly unfolding the respective groups when the catches are moved to a released position.

2. A fender for automobiles, comprising a fender bar, a plurality of folding guard fingers carried thereby, means for normally holding said fingers in a folded position, spring means for moving the fingers to an unfolded position, and a stop for limiting the unfolding action of said fingers, said stop being formed with an extension presenting a catch for locking the fingers against accidental movement after they have been unfolded.

3. A fender, comprising a fender bar adapted to be connected to the front of a vehicle, a supporting bar connected to said fender bar and spaced therefrom between the ends, a group of guarding fingers arranged on each side of said supporting bar, one group extending from near one end of the supporting bar to near the center and the other group from near the opposite end of the supporting bar to near the center, a manually actuated catch engaging certain parts of said groups for normally holding the same folded, a spring for each group for quickly moving the groups to an unfolded position when said patches have been released, and a combined stop and lock for each group for limiting their unfolding movement and for preventing a turning movement when once unfolded.

MICHAEL K. GILÉWICZ.